United States Patent
Torchio et al.

(10) Patent No.: US 12,460,690 B2
(45) Date of Patent: Nov. 4, 2025

(54) AIRCRAFT BRAKE ASSEMBLY SENSING DEVICE

(71) Applicant: Collins Aerospace Ireland, Limited, Cork (IE)

(72) Inventors: Marcello Torchio, Glanmire (IE); Artur Robert Luber, Ścinawka Górna (PL)

(73) Assignee: COLLINS AEROSPACE IRELAND, LIMITED, Cork (IE)

( * ) Notice: Subject to any disclaimer, the term of this patent is extended or adjusted under 35 U.S.C. 154(b) by 92 days.

(21) Appl. No.: 18/504,373

(22) Filed: Nov. 8, 2023

(65) Prior Publication Data
US 2024/0183418 A1 Jun. 6, 2024

(30) Foreign Application Priority Data
Dec. 5, 2022 (EP) .................................. 22211392

(51) Int. Cl.
*F16D 66/02* (2006.01)
*B60T 8/17* (2006.01)
*B60T 17/22* (2006.01)

(52) U.S. Cl.
CPC .......... *F16D 66/024* (2013.01); *B60T 8/1703* (2013.01); *B60T 17/22* (2013.01)

(58) Field of Classification Search
CPC ....... F16D 66/024; B64C 25/44; B60T 17/22; B60T 8/1703
See application file for complete search history.

(56) References Cited

U.S. PATENT DOCUMENTS

| | | | |
|---|---|---|---|
| 4,658,936 A | 4/1987 | Moseley | |
| 8,437,934 B2* | 5/2013 | Degenstein | B60T 8/268 188/1.11 R |
| 9,964,168 B1 | 5/2018 | Pennala et al. | |
| 10,336,473 B2 | 7/2019 | Bill | |
| 11,965,569 B2* | 4/2024 | Torchio | B64C 25/34 |
| 2017/0363482 A1 | 12/2017 | Bruggemann et al. | |

(Continued)

FOREIGN PATENT DOCUMENTS

EP 2972162 1/2016

OTHER PUBLICATIONS

EPO, Extended European Search Report dated Jun. 26, 2023 in EP Serial No. 22211392.0.

(Continued)

*Primary Examiner* — John A Tweel, Jr.
(74) *Attorney, Agent, or Firm* — SNELL & WILMER L.L.P.

(57) ABSTRACT

The present invention relates to a sensing device for monitoring aircraft brake assemblies, in particular the sensing device is for monitoring wear and/or temperature of the aircraft brake assembly. The device comprises a housing rigidly connected to the chassis of the aircraft brake assembly, wherein the housing comprises a displacement sensor. The device further comprises a pin extending through the housing with a first end configured to move with a pressure plate of the aircraft brake assembly such that, in use, the pin is configured to move relative to the housing in a longitudinal direction of the pin. The pin comprises a detectable element positioned within the housing, and the displacement sensor is configured to monitor the position of the detectable element within the housing.

15 Claims, 3 Drawing Sheets

(56) References Cited

U.S. PATENT DOCUMENTS

| | | |
|---|---|---|
| 2020/0080609 A1 | 3/2020 | Muniraju et al. |
| 2020/0307530 A1 | 10/2020 | Georgin |
| 2021/0229651 A1 | 7/2021 | Al-Tabakha |
| 2022/0316541 A1 | 10/2022 | Torchio |
| 2023/0211767 A1* | 7/2023 | Heid .................. G01M 99/002 188/1.11 R |

OTHER PUBLICATIONS

EPO, Partial European Search Report dated May 4, 2023 in EP Serial No. 22211392.0.

* cited by examiner

AIRCRAFT BRAKE ASSEMBLY SENSING DEVICE

CROSS-REFERENCE TO RELATED APPLICATIONS

This application claims priority to, and the benefit of, EP Patent Application No. 22211392.0, filed Dec. 5, 2022 and titled "AIRCRAFT BRAKE ASSEMBLY SENSING DEVICE," which is incorporated by reference herein in its entirety for all purposes.

FIELD

The present invention relates to a sensing device for monitoring an aircraft brake assembly. The invention also extends to an aircraft brake assembly comprising a sensing device.

BACKGROUND

Aircraft brakes typically comprise a stack of brake discs composed of a plurality of interleaved rotors and stators. The rotors are the rotary parts of the brake stack which are connected to the wheels of the landing gear, and the stators are the stationary parts that do not rotate and are used to brake the rotors.

During a braking event, the stack of brake discs is compressed together by two pressure plates at either end of the stack which increases the friction between the brake discs, thus reducing the speed of the aircraft.

Due to the high levels of friction present during a brake event, aircraft brake discs will wear over time causing the brake discs to reduce in thickness during their lifetime. This wear reduces the effectiveness of the aircraft brakes and so it is important that it is monitored to ensure the brake discs are replaced after a significant amount of wear.

In addition to wear, a braking event generates a significant amount of heat due to the friction forces present between the discs. In order for the brakes to operate effectively, the temperature of the discs must be below a predetermined threshold and it is therefore important that the brake disc temperature is accurately monitored accordingly.

Aircraft brakes are conventionally formed of robust metals such as steel in order to withstand the conditions typically present during a braking event. Recently brake discs have been formed of Carbon-Carbon (C/C) composites which are durable and highly temperature resistant, and also lightweight compared to steel. However, C/C brakes are subject to more wear.

Conventional braking systems use a wear pin to monitor brake wear. A wear pin is a pin attached to and extending from the brake discs to provide a visual indication of wear. The wear pin is connected at one end to the pressure plate and its other end extends from the brake housing by a set distance. As the brake discs wear and reduce in thickness the pressure plate will move further towards the stack of rotors and stators to keep the brake stack compact. The amount the wear pin extends from the brake housing will therefore reduce as it moves with the pressure plate. The amount of the wear pin extending from the housing may, thus, be measured to determine the wear of the brake disc. Once the amount of wear is beyond a pre-determined threshold the brake discs are replaced.

The problems identified with conventional visual wear pins is that they are labor intensive and it can sometimes be difficult to properly access the wear pin in order to take measurements. It is also necessary for the measurements to be logged manually meaning that they are prone to human error. There is therefore a need to provide an improved system for monitoring wear.

Conventionally, the temperature of the brake stack is measured by a thermocouple installed in the torque plate of the brake assembly. This is not a particularly precise measurement as the location does not provide good exposure to the temperatures of the brakes, and significant lags in the measurement can arise. The temperature sensor reading is used to warn a pilot of a "hot brakes" condition causing them to delay take-off until the brakes have cooled to an acceptable level. In view of the inaccuracy of current temperature sensors, a conservative estimate is used for the "hot brakes" condition which leads to take-off being delayed unnecessarily in certain instances.

There is therefore a need to provide an improved sensing device capable of being configurable for accurately monitoring both wear and temperature of a brake disc stack.

SUMMARY

Viewed from a first aspect, there is provided a sensing device for monitoring an aircraft brake assembly, the sensing device comprising: a housing configured to be rigidly connected to the chassis of the aircraft brake assembly, the housing comprising a displacement sensor; and a pin extending through the housing and comprising a first end configured to move with a pressure plate of the aircraft brake assembly such that, in use, the pin is configured to move relative to the housing in a longitudinal direction of the pin; wherein the pin comprises a detectable element positioned within the housing, and wherein the displacement sensor is configured to monitor the position of the detectable element within the housing.

The pin may comprise a visual wear detection portion extending from the housing in a direction away from the pressure plate.

The housing may comprise a transmitter configured to receive sensor data from the displacement sensor, and may be configured to transmit the sensor data to a central receiver.

The pin may comprise a temperature sensing portion located proximate the first end of the pin configured to monitor a temperature of the pressure plate.

The sensing surface of the temperature sensing portion may be configured to be in direct contact with the pressure plate.

The transmitter may be configured to receive sensor data from the temperature sensor, and may be configured to transmit the sensor data to a central receiver.

The transmitter may be connected to the displacement sensor and to the temperature sensor by a wired connection.

The displacement sensor may comprise a linear variable differential transformer (LVDT) sensor.

The first end of the pin may be configured to be rigidly connected to the pressure plate.

The first end of the pin may be biased towards the pressure plate, optionally using a spring.

The sensing device may comprise a protective shield configured to extend from the housing to the pressure plate to enclose a portion of the pin extending from the housing to the pressure plate, wherein the protective shield may be configured to move with the pressure plate so that, in use, the protective shield moves relative to the housing.

The protective shield may be rigidly connected to the pressure plate proximate the first end of the pin, and/or may be rigidly connected to the pin at a point along the length of the pin.

Viewed from a second aspect, there is provided an aircraft brake assembly comprising: a plurality of brake discs including one or more stators and one or more rotors; a pressure plate located at a first side of the brake assembly; a chassis comprising one or more pistons configured to actuate the pressure plate to urge the plurality of brake discs together in use; and a sensing device as descried in the first aspect above, wherein the housing is rigidly connected to the chassis of the aircraft brake assembly, and wherein the pin is configured to move with one of the first or second pressure plates.

Viewed from a third aspect, there is provided a method of monitoring an aircraft brake assembly comprising: providing a housing rigidly attached to the chassis of an aircraft brake assembly, wherein the housing comprises a displacement sensor; providing a pin which extends through the housing to a first end which moves with a pressure plate of the aircraft brake assembly so that the pin moves relative to the housing; wherein the pin comprises a detectable element located within the housing; and monitoring a position of the detectable element within the housing using the displacement sensor.

The method may comprise any of the feature described in relation to the first or second aspects above.

Viewed from a fourth aspect, there is provided a sensing device for monitoring an aircraft brake assembly, the sensing device comprising: a housing configured to be rigidly connected to the chassis of the aircraft brake assembly, the housing comprising a transmitter; and a pin extending through the housing and comprising a first end configured to contact a pressure plate of the aircraft, wherein in use the pin is configured to move with the pressure plate relative to the housing in a longitudinal direction of the pin; wherein the first end of the pin comprises a temperature sensor configured to monitor a temperature of the pressure plate; wherein the transmitter is configured to receive sensor data from the temperature sensor via a wired connection, and to transmit the sensor data to a receiver external to the housing.

The sensing device may comprise any of the features described in connection with the first and second aspects above. In addition, according to yet a further aspect, there is provided a method of monitoring a brake assembly using the sensing device as described in the fourth aspect.

BRIEF DESCRIPTION OF THE DRAWINGS

Certain preferred embodiments of the present invention will now be described, by way of example only, with reference to the following drawings, in which.

DETAILED DESCRIPTION

Figure 1A:
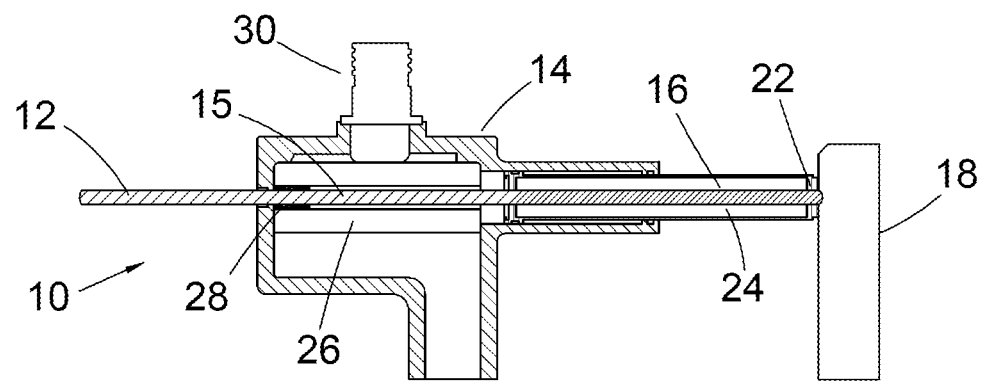
FIG. 1A shows a schematic of a sensing device for monitoring wear and temperature of an aircraft brake assembly coupled to a new brake assembly.
Figure 1B:
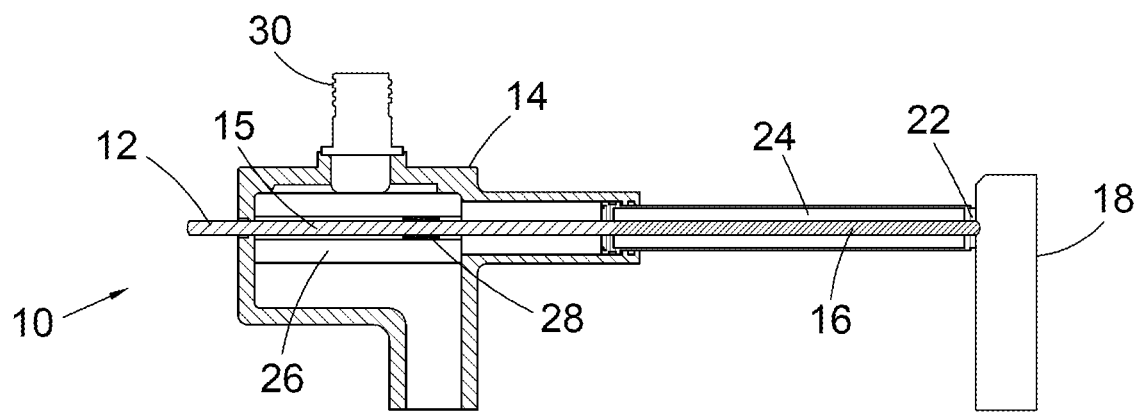
FIG. 1B shows a schematic of a sensing device for monitoring wear and temperature of an aircraft brake assembly coupled to a worn brake assembly.

FIG. 1A depicts a schematic of a sensing device 10 for monitoring both wear and temperature of an aircraft brake assembly coupled to a new brake assembly. FIG. 1B depicts the modular sensing device 10 after the brake assembly has become worn.

The sensing device 10 comprises a housing 14 which is fixed relative to the piston housing of the aircraft brake assembly. The housing 14 therefore maintains a constant position relative to the aircraft brake assembly as a whole.

Figure 5A:
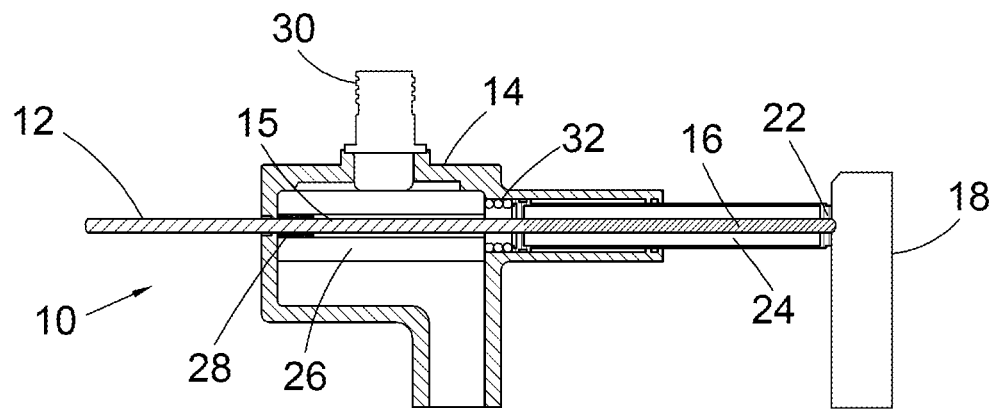
FIG. 5A shows a schematic of a sensing device for monitoring wear and temperature of an aircraft brake assembly coupled to a new brake assembly.
Figure 5B:
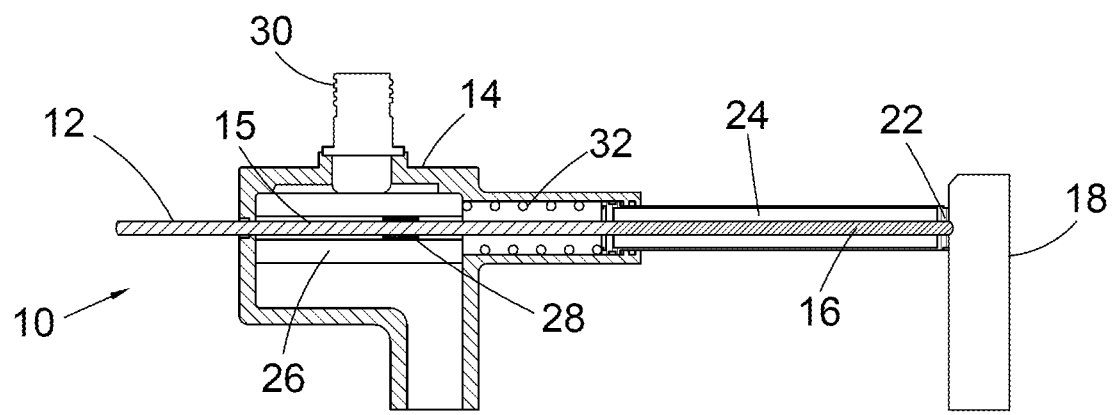
FIG. 5B shows a schematic of a sensing device for monitoring wear and temperature of an aircraft brake assembly coupled to a worn brake assembly.

The sensing device 10 comprises a pin 12, 15, 16 which extends through the housing 14 and comprises a first end 22 connected to a pressure plate 18 of the aircraft brake assembly. The first end 22 is fixed relative to the pressure plate 18 so that the pin 12, 15, 16 moves with the pressure plate 18. The first end 22 may be fixed relative to the pressure plate 18 by a rigid connection, such as a rivet as is depicted in FIGS. 1A and 1B. Alternatively, the first end 22 may be biased against the pressure plate 18 using a spring 32 so that the first end 22 maintains contact with the pressure plate 18 during use as depicted in FIGS. 5A and 5B.

The housing 14 comprises a through-hole (not shown) for receiving the pin 12, 15, 16 and allowing axial movement of the pin 12, 15, 16 through the housing 14.

The pin comprises a visual wear detection portion 12, an automatic wear detection portion 15 and a temperature sensing portion 16. The visual wear detection portion 12, automatic wear detection portion 15 and temperature sensing portion 16 may each be separate pins joined together to form the pin 12, 15, 16, or alternatively, each of the visual wear detection portion 12, automatic wear detection portion 15 and temperature sensing portion 16 may be one integral pin extending from the first end 22 to the visual wear detection portion 12.

In use, the visual wear detection portion 12 operates as in conventional systems whereby as the discs of the brake assembly wear over time, the pressure plate 18 will move towards the stack of brake discs as depicted in FIG. 1B. As the pin 12, 15, 16 is fixed relative to the pressure plate 18 at the first end, the pin 12, 14 and 16 will move with the pressure plate relative to the housing 14. This reduces the exposed length of the pin 12, 15, 16 which forms the visual wear detection portion 12. The length of the visual wear detection portion 12 which extends from the housing 14 can therefore be measured in order to monitor the wear of the brake assembly.

In addition to permitting visual wear detection, the sensing device 10 provides a means for automatically detecting movement of the pin 12, 15, 16 in order to detect wear of the brake discs.

The housing 14 comprises a displacement sensor 26. The displacement sensor 26 may be any type of sensor capable of measuring an axial movement of a detectable element 28 through the housing. In the present example the displacement sensor 26 is a linear variable differential transformer (LVDT) sensor, preferably a free-core LVDT sensor.

The automatic wear detection portion 15 of the pin comprises a free core 28 fixed at a point along the pin within the housing 14. As the pin 12, 15, 16 moves with the pressure plate 18, the position of the free core 28 moves within the displacement sensor 26 as shown in FIGS. 1A and 1B.

The LVDT sensor 26 is configured to monitor the position of the free core 28 in order to accurately and automatically determine the wear of the brake assembly without the need for manual inspection. The sensing device 10 is therefore able to quantify the axial movement of the free core 28, and therefore the axial movement of the pin in order to determine the amount of wear present.

The displacement sensor 26 may provide a warning to a pilot when the wear of the brake assembly is at or near a predetermined threshold. This warning may be used to prompt a visual inspection to be performed by an engineer using the visual wear detection portion 12 of the pin 12, 15, 16.

In addition, the level of wear determined by the displacement sensor 26 may be shared with an online cloud server to be analyzed at a central location. The wear data can then be used to predict when the brake assembly will need to be replaced, and be used to optimize the deployment of maintenance teams and supply of replacement brake assemblies.

In addition, or as an alternative to being analyzed at a central location, the data collected by the displacement sensor 26 may also be shared with one or more local servers. The one or more local servers may be located onboard the aircraft or at an airport. This data can be accessed via a wireless network for analysis.

The predetermined threshold is typically set by the manufacturer of the brake assembly.

The use of a displacement sensor 26 within the housing to monitor axial movement of the pin provides an automatic measurement without requiring a manual reading from the visual wear detection portion. This eliminates human error and provides more efficient and accurate measurements. Any measurements from the displacement sensor 26 can also be verified using the visual wear detection portion 12 if necessary.

The arrangement whereby the pin 12, 15, 16 is located within the housing 14 allows the displacement sensor 26 to be positioned within the housing 14. In some known systems, the pin 12, 15, 16 may be fixed to the pressure plate without an additional housing 14 and so any sensing architecture must be housed within an internal bore of the pin 12, 15, 16 itself. This requires the sensors to be compact which greatly increases complexity and cost of manufacture and assembly. By providing a housing 14, through which the pin 12, 15, 16 moves in use, these strict space requirements are alleviated as the displacement sensor 26 can be located within the housing 14, and there is no requirement to house sensing architecture within the pin 12, 15, 16 for the purpose of monitoring wear.

The temperature sensing portion 16 may comprise any form of temperature sensor. In the present example, the temperature sensing portion 16 comprises a thermocouple. The temperature sensing portion 16 may optionally be housed within a tube 24. The tube 24 is beneficial as it ensures a solid connection of the temperature sensing portion 16 and the pressure plate 18 while also protecting the temperature sensing portion 16 of the pin 12, 15, 16.

As shown in FIGS. 1A and 1B, the tube 24 extends from the pressure plate 18 into the housing 14 and comprises a flange configured to engage a complimentary flange on the housing 14. The presence of the flange on the internal surface of the tube 24 seals the housing to protect it from the external conditions. In addition, the flange provides a stopping point for movement of the pin 12, 15, 16 within the housing 14.

As discussed in relation to the first end 22 of the pin 12, 15, 16, the tube 24 is fixed relative to the pressure plate 18 so that it moves with the pressure plate in use. The tube 24 may be rigidly connected to the pressure plate 18 at one end, and at another point along its length the tube 24 may be connected to the temperature sensing portion 16 of the pin 12, 15, 16. Alternatively, as shown in FIGS. 5A and 5B, the tube 24 may be biased against the pressure plate 18 using a spring 32. In this arrangement, the temperature sensing portion 16 of the pin 12, 15, 16 may not be affixed to the pressure plate 18, but may instead be pressed against the pressure plate 18 by the tube 24. The movement of the pressure plate 18 causes the pin 12, 15, 16 to move through the rigid connection between the tube 25 and temperature sensing portion 16 of the pin.

Alternatively, it may be the temperature sensing portion 16 of the pin 12, 15, 16 which is rigidly connected to the pressure plate 18, and the tube 24 may therefore be pressed against the plate 18 through the rigid connection between the tube 24 and the temperature sensing portion 16 of the pin.

The connection of the tube 24 and/or the temperature sensing portion 16 of the pin 12, 15, 16 is provided by means of any suitable mechanical device, for example rivets. Alternatively, connection of the tube 24 and/or the temperature sensing portion 16 of the pin can be provided by a biasing means such as a spring 32. The spring 32 may be located within the housing 14 and may urge against the flange of the tube 24 in order to bias it towards the pressure plate 18.

In alternative arrangements, the tube 24 may be rigidly connected to the pressure plate 18 and the temperature sensing portion 16 of the pin may be biased against the pressure plate 18 through use of a spring. In this arrangement there may therefore be no direct rigid connection between the tube 24 and the temperature sensing portion 16 of the pin 12, 15, 16.

The use of a portion 16 of the wear pin 12, 15, 16 as a temperature sensing portion 16 provide improved measurements for brake assembly temperatures as the heat source (i.e., the brake assembly) is in direct contact with the temperature sensing portion 16. This improves the accuracy of the measurement meaning that the conservative estimates previous used will no longer be required. The result is that the system will accurately determine when the brake temperature is below the required threshold meaning that take-off is not delayed unnecessarily.

The housing 14 comprises a transmitter 30 configured to connect the sensor portions of the pin 12, 15, 16 to a receiver (not shown). The transmitter 30 may connect to the displacement sensor 26 and the temperature sensor 16 via a wired connection. This reduces the complexity of the sensors and allows the data to be collated by a single transmitter 30 over a wired connection, to then be transmitted to a central receiver for analysis.

This is in contrast to known systems discussed above where the sensing portions are located within the pin 12, 15, 16 and operate wirelessly due to the absence of a fixed housing 14 able to house the necessary wiring and other components. The present arrangement is therefore beneficial in that the complexity of the system is reduced and ease of maintenance is improved.

A receiver may be located centrally within the aircraft and may be configured to collate the sensor data and output the measurements. The measurements may be output to a display to provide information of wear and/or temperature of the brake assembly to the pilot of the aircraft.

The embodiment depicted includes a tube 24 as discussed above. The tube 24 ensures a rigid connection of the pin 12, 14, 15 and protects the temperature sensing portion 16 of the pin 12, 15, 16. However, it will be appreciated that in other examples, the tube 24 may not be present on the sensing device 10. In this case, the temperature sensing portion 16 may extend from the housing 14 and contact the pressure plate 18. The temperature sensing portion 16 of the pin 12, 15, 16 may therefore be exposed in this arrangement. Alternatively, the temperature sensing portion 16 may not be present in the sensing device 10 at all, and the respective portion of the pin 12, 15, 16 may simply form an extension of the automatic wear detection portion 15 of the pin 12, 15, 16. The automatic wear detection portion 15 of the pin is typically more robust than a thermocouple, which could form the temperature sensing portion 16.

The examples set out above describe a sensing device 10 which comprises a pin 12, 15, 16 including three distinct portions: a visual wear detection portion 12, an automatic wear detection portion 15, and a temperature sensing portion 16. However, alternative arrangements exist whereby only a subset of each of these portions is present on the system depending on the specific requirements of the aircraft as a whole.

Figure 2:
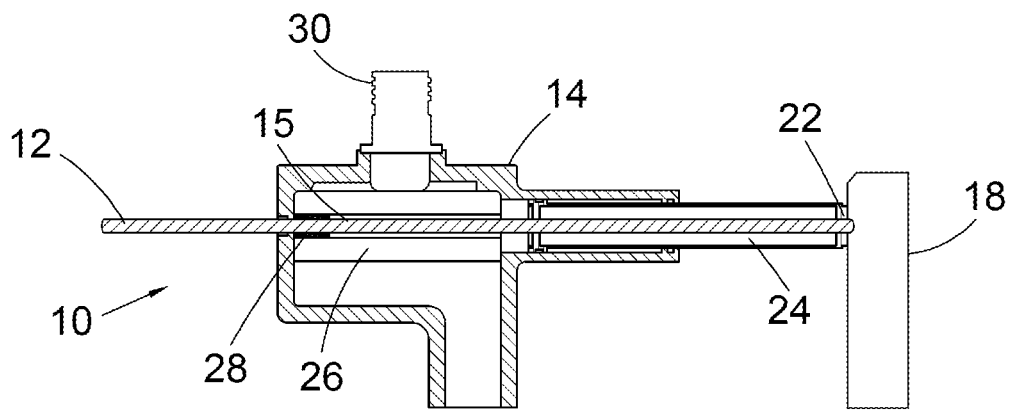
FIG. 2 shows a schematic of a sensing device for monitoring wear only in an aircraft brake assembly.

For example, it may be that no temperature sensing portion 16 is required. FIG. 2 depicts a sensing device 10 wherein the temperature sensing portion 16 is omitted. Instead, the sensing device 10 includes only the visual wear detection portion 12 and the automatic wear detection portion 15. In this example, the automatic wear detection portion 15 extends to the first end 22 for engagement with the pressure plate 18.

The example in FIG. 2 comprises the tube 24 surrounding the portion of the pin 12, 15 proximate the pressure plate 18. However, it will be appreciated that in view of the discussion above, as the temperature sensing portion 16 has been omitted, there is less need to provide protection to the pin and so the tube 24 can also be omitted. In this case, the portion of the pin 12, 15 which extends between the housing 14 and the pressure plate 18 may be exposed, and the first end 22 of the pin 12, 15 may be fixed directly to the pressure plate 18.

In operation, as the discs of the brake assembly wear over time, the pressure plate 18 will move away from the housing 14 and so the pin 12, 15 may move with the pressure plate 18 through the housing 14. The operation of the visual wear detection portion 12 and automatic wear detection portion 15 is the same as in the example described above in relation to FIG. 1.

Figure 3:
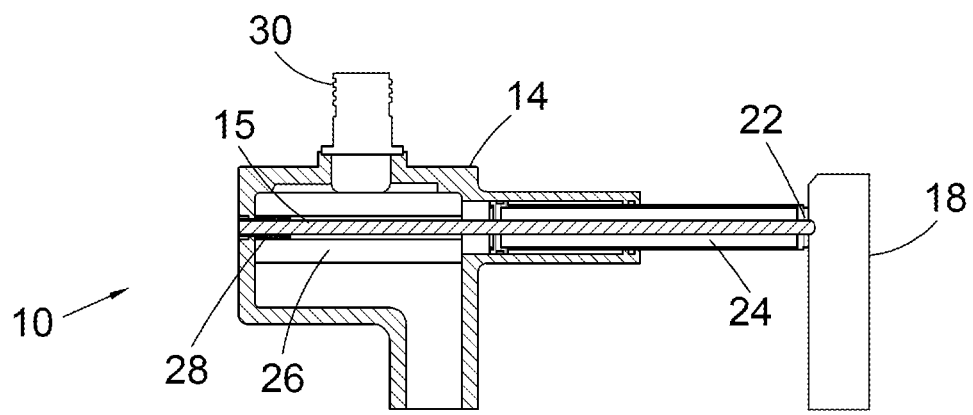
FIG. 3 shows a schematic of a sensing device for monitoring wear only in an aircraft brake assembly.

FIG. 3 depicts a further example where the length of the pin 15 is reduced so that it does not extend beyond the housing 14 at the side opposite to the pressure plate 18 and the first end 22 of the pin. In this arrangement, there is no portion of the pin 15 which acts as a visual wear detection portion 12. This is beneficial in compact systems with limited space on the landing gear. Conventional systems would not be able to omit the visual wear detection aspect as it is typically the sole method for monitoring wear, but the provision of the automatic wear detection portion 15 ensures that wear is still accurately and efficiently monitored without the need for the visual wear pin 12 common on most aircraft brake assemblies.

In FIG. 3, as is the case in the example shown in FIG. 2, the temperature sensing portion 16 is also omitted and so only the automatic wear detection portion 15 is present in the pin 15. As such, the terminal tube 24 may be omitted as there is less protection required for the portion of the pin extending between the housing 14 and the first end 22 at the pressure plate 18 in the example of FIG. 3.

Figure 4:
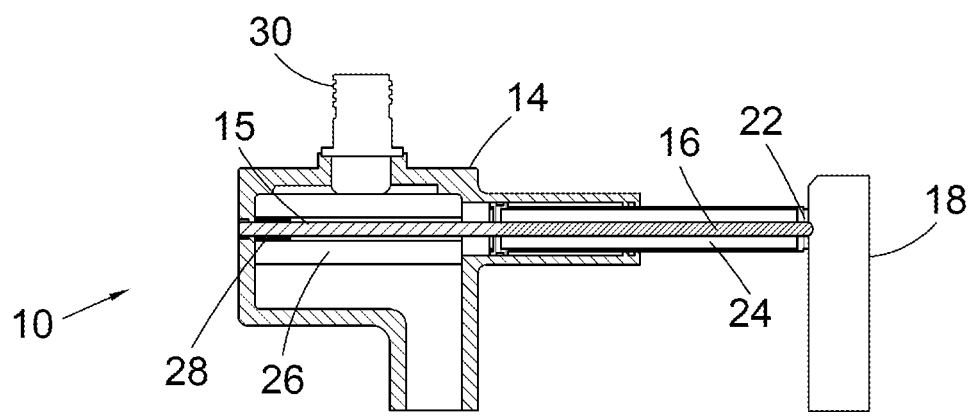
FIG. 4 shows a schematic of a sensing device for monitoring wear and temperature of an aircraft brake assembly.

FIG. 4 depicts a further example of the sensing device 10 where the pin 15, 16 includes an automatic wear sensing portion 15 and a temperature sensing portion 16. The length of the pin 15, 16 is reduced, as in FIG. 3, so that it does not extend beyond the housing 14 on the side opposite the pressure plate 18 and the first end 22 so that no visual wear detection portion 12 is present. The automatic wear detection portion 15 and temperature sensing portion 16 operate in the same manner as described in connection with FIGS. 1A and 1B above.

What is claimed is:

1. A sensing device for monitoring an aircraft brake assembly, the sensing device comprising:
    a housing configured to be rigidly connected to the chassis of the aircraft brake assembly, the housing comprising a displacement sensor; and
    a pin extending through the housing and comprising a first end configured to move with a pressure plate of the aircraft brake assembly such that, in use, the pin is configured to move relative to the housing in a longitudinal direction of the pin;
    wherein the pin comprises a detectable element portion positioned within the housing and comprising a first end and a second end and wherein the displacement sensor is configured to monitor the position of the detectable element portion within the housing,
    wherein the pin comprises a temperature sensing portion located between the first end of the detectable element portion and the pressure plate and configured to monitor a temperature of the pressure plate, and
    wherein the pin comprises a visual wear detection portion located proximate the second end of the detectable element portion and extending from the housing in a direction away from the pressure plate and configured to indicate wear of brake discs in the aircraft brake assembly.

2. The sensing device of claim 1, wherein the housing comprises a transmitter configured to receive sensor data from the displacement sensor, and configured to transmit the sensor data to a central receiver.

3. The sensing device of claim 1, wherein the sensing surface of the temperature sensing portion is configured to be in direct contact with the pressure plate.

4. The sensing device of claim 2, wherein the transmitter is configured to receive sensor data from the temperature sensor, and configured to transmit the sensor data to a central receiver.

5. The sensing device of claim 4, wherein the transmitter is connected to the displacement sensor and to the temperature sensor by a wired connection.

6. The sensing device of claim 1, wherein the displacement sensor comprises a linear variable differential transformer (LVDT) sensor.

7. The sensing device of claim 1, wherein the first end of the pin is configured to be rigidly connected to the pressure plate.

8. The sensing device of claim 1 wherein the first end of the pin is biased towards the pressure plate, optionally using a spring.

9. The sensing device of claim 1, comprising a protective shield configured to extend from the housing to the pressure plate to enclose a portion of the pin extending from the housing to the pressure plate, wherein the protective shield is configured to move with the pressure plate so that, in use, the protective shield moves relative to the housing.

10. The sensing device of claim 9, wherein the protective shield is rigidly connected to the pressure plate proximate the first end of the pin, and/or is rigidly connected to the pin at a point along the length of the pin.

11. An aircraft brake assembly comprising:
a plurality of brake discs including one or more stators and one or more rotors;
a pressure plate located at a first side of the brake assembly;
a chassis comprising one or more pistons configured to actuate the pressure plate to urge the plurality of brake discs together in use; and
the sensing device according to claim 1, wherein the housing is rigidly connected to the chassis of the aircraft brake assembly, and wherein the pin is configured to move with one of the first or second pressure plates.

12. The sensing device of claim 1, wherein the detectable element portion, the temperature sensing portion, and the visual wear detection portion are joined together to form the pin.

13. The sensing device of claim 1, wherein the detectable element portion, the temperature sensing portion, and the visual wear detection portion form one integral pin.

14. A method of monitoring an aircraft brake assembly comprising:
providing a housing rigidly attached to the chassis of an aircraft brake assembly, wherein the housing comprises a displacement sensor;
providing a pin which extends through the housing to a first end which moves with a pressure plate of the aircraft brake assembly so that the pin moves relative to the housing; wherein the pin comprises a detectable element portion positioned within the housing and comprising a first end and a second end, wherein the pin comprises a temperature sensing portion located between the first end of the detectable element portion and the pressure plate, and wherein the pin comprises a visual wear detection portion located proximate the second end of the detectable element portion and extending from the housing in a direction away from the pressure plate;
monitoring a position of the detectable element within the housing using the displacement sensor;
monitoring a temperature of the pressure plate via the temperature sensing portion; and
monitoring wear of brake discs in the aircraft brake assembly via the visual wear detection portion.

15. A sensing device for monitoring an aircraft brake assembly, the sensing device comprising:
a housing configured to be rigidly connected to the chassis of the aircraft brake assembly, the housing comprising a transmitter; and
a pin extending through the housing and comprising a first end configured to contact a pressure plate of the aircraft, wherein in use the pin is configured to move with the pressure plate relative to the housing in a longitudinal direction of the pin;
wherein the pin comprises a detectable element portion positioned within the housing and comprising a first end and a second end and wherein the displacement sensor is configured to monitor the position of the detectable element portion within the housing,
wherein the pin comprises a temperature sensor portion located between the first end of the detectable element portion and the pressure plate and configured to monitor a temperature of the pressure plate and wherein the transmitter is configured to receive sensor data from the temperature sensor via a wired connection and to transmit the sensor data to a receiver external to the housing, and
wherein the pin comprises a visual wear detection portion located proximate the second end of the detectable element portion and extending from the housing in a direction away from the pressure plate and configured to indicate wear of brake discs in the aircraft brake assembly.

* * * * *